R. M. WITHYCOMBE.
ARTIFICIAL TOOTH.
APPLICATION FILED NOV. 13, 1917.

1,333,007. Patented Mar. 9, 1920.

Witnesses:
Inventor
Robert M. Withycombe
by James L. Norris
Attorney

UNITED STATES PATENT OFFICE.

ROBERT MORSE WITHYCOMBE, OF SYDNEY, NEW SOUTH WALES, AUSTRALIA.

ARTIFICIAL TOOTH.

1,333,007.   Specification of Letters Patent.   Patented Mar. 9, 1920.

Application filed November 13, 1917. Serial No. 201,747.

*To all whom it may concern:*

Be it known that I, ROBERT MORSE WITHYCOMBE, a subject of the King of Great Britain, residing at Sydney, in the State of New South Wales, Commonwealth of Australia, have invented certain new and useful Improvements in and Relating to Artificial Teeth, of which the following is a description.

This invention has reference to improvements in connection with the resilient fitting of artificial teeth in dentures or on the roots of natural teeth and is a further development of the invention covered by my prior Letters Patent No. 1,105,476 of July 28, 1914.

One object of the present invention is to obtain an adhesion which will insure a better asepsis and permit a slight torque or twisting movement as in the case of a natural tooth. A further object is to obtain an increased resiliency during the act of mastication or prehension between the artificial tooth and the socket or other substantially rigid base within or against which it is held.

In order that the resilient member, viz., soft vulcanizing rubber or like material, may closely resemble the effect of the fibers which form the connective tissue with the cementum of a natural tooth, the root portion of the artificial tooth is perforated or roughened or pitted in regular or irregular formations in any suitable manner. Owing to the adhesion of portions of the soft resilient material into the pits or interstices formed in the artificial tooth and also to the socket or base, the tooth is assisted to return to its normal position on release of the pressure caused by mastication or prehension.

Preferably I form the porcelain tooth in such a manner that the root portion thereof (being analogous to the cementum of the natural tooth) assumes a serrated or roughened appearance by baking or fusing sheet metal or metallic particles on to the root portion whereby a most adhesive and impervious connection can be made with the soft vulcanizing rubber or like resilient element.

To obtain the increased resiliency, in one of the rigid elements, viz., the artificial tooth or the base, or in the resilient element itself, a recess or recesses is or are formed which acts or act as an air chamber or air chambers into which the compressed resilient material is temporarily displaced while the vertical or oblique pressure or both is or are taking place during mastication or prehension.

But in order that the invention may be readily understood, I will now describe same with reference to the drawings herewith which illustrate the preferred form.

Fig 6 is a cross section through a denture showing a tooth in position, while,

The same reference numerals indicate the same or like parts.

Figure 1:
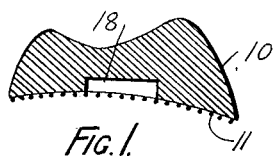
Figure 1 is a sectional elevation illustrating an artificial porcelain tooth made in accordance with the invention, and, Fig. 2, a plan view.
Figure 5:
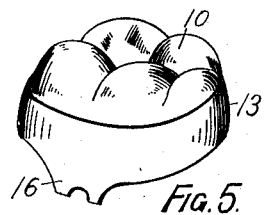
Fig. 5 is a perspective view of a tooth in its socket.
Figure 2:
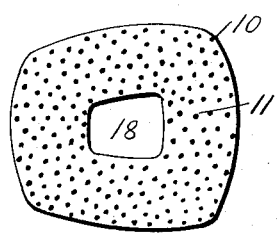
Figure 6:
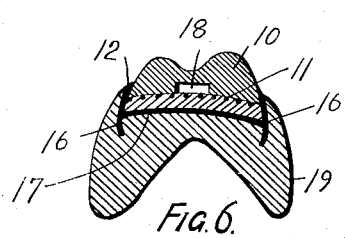
Figure 3:
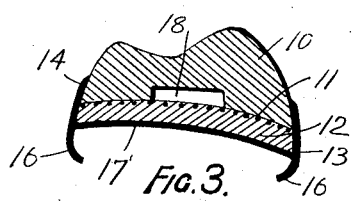
Fig. 3 is a sectional elevation showing a porcelain tooth in its metal socket or collar, and, Fig. 4, a plan thereof.
Figure 7:
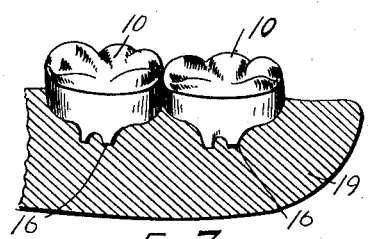
Fig. 7 is a longitudinal section through a denture showing two teeth.
Figure 4:
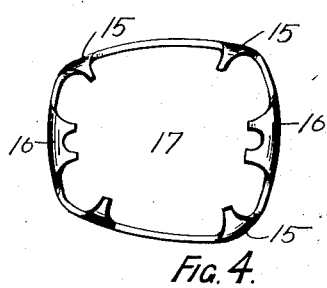

10 represents a porcelain tooth having a multiplicity of small pits or interstices on its root portion preferably formed by baking or fusing metallic particles or fillings 11 thereon. 12 is a thin layer or cushion of soft vulcanizing rubber or like resilient element. 13 represents a socket or collar having the slightly inclined upward walls 14 and downwardly projecting clips 15 capable of being forced inwardly to engage and hold the loose base plate 17 in position as shown in Figs. 3, 4, and 7. Tags or buckles 16 assist in retaining the tooth as a whole in the denture. 18 is a recess or air chamber in the porcelain tooth. In some cases this recess or recesses may be formed in the base plate or in the cushion itself.

The base of the socket or collar may be integral therewith but is preferably a separate plate for convenience in manufacture and insertion of the soft rubber and said plate may be of hard vulcanizing rubber as I find hard rubber insures better retention to the soft rubber and also to the vulcanite denture. The plate is held to the socket or collar by the clips 15 but should any of the clips or buckles not be necessary they may be bent inwardly substantially at right angles with the sides.

19 is a denture or plate.

On pressure being applied to the tooth, a portion of the soft vulcanizing rubber is temporarily displaced into the recess or recesses and as it adheres firmly to the roughened portion of the tooth and also to the base plate, the tooth is returned to its normal position on release of the pressure caused by mastication or prehension.

Having thus described my invention what I claim as new and desire to protect by Letters Patent, is:—

1. An artificial porcelain tooth adapted for use with a resilient cushion of soft vulcanizing rubber or like material, and having its root portion provided with a multiplicity of small surface interstices or pits whereby to obtain greater adhesion with the said cushion.

2. An artificial porcelain tooth adapted for use with a resilient cushion of soft vulcanizing rubber or like material, and having metallic particles fused on its root portion whereby to obtain greater adhesion with the said cushion.

3. An artificial tooth structure comprising a tooth supporting collar and a tooth and a resilient cushion of soft vulcanizing rubber or like material fitted in said collar, the cushion being arranged under said tooth, one of the parts inclosed in said collar being provided with a normally vacant recess or recesses into which a portion of the soft rubber is temporarily displaced when the tooth is under the pressure of mastication or prehension, substantially as described.

4. An artificial tooth structure comprising a tooth supporting collar and a tooth and a resilient cushion of soft vulcanizing rubber or like material fitted in said collar, the cushion being arranged under said tooth, one of the parts inclosed in said collar being provided with a normally vacant recess or recesses into which a portion of the soft rubber is temporarily displaced when the tooth is under the pressure of mastication or prehension, the tooth having its root portion provided with a multiplicity of small surface interstices or pits whereby to obtain greater adhesion with the said cushion, substantially as described.

5. An artificial tooth structure comprising a tooth, a cushion therefor of soft vulcanizing rubber, a collar retaining said tooth and said cushion, a loose plate of hard rubber or metal in the bottom of said collar and held by clips on said collar, said tooth having in its base a normally vacant recess or recesses into which the soft rubber is adapted to be temporarily displaced under pressure substantially as described and as illustrated.

In testimony whereof I have hereunto set my hand in presence of two subscribing witnesses.

ROBERT MORSE WITHYCOMBE.

Witnesses:
HENRY W. CLARKE,
CHARLES E. GRAHAM.